(12) United States Patent
Hill (10) Patent No.: US 9,073,669 B2
(45) Date of Patent: Jul. 7, 2015

(54) TRANSPARENT SHOPPING CART AND SHOPPING BASKET ADVERTISING PANELS, SYSTEM AND METHODS OF MANUFACTURE AND USE OF SAME

(71) Applicant: Katie Hill, Cedar Rapids, IA (US)

(72) Inventor: Katie Hill, Cedar Rapids, IA (US)

(*) Notice: Subject to any disclaimer, the term of this patent is extended or adjusted under 35 U.S.C. 154(b) by 0 days.

(21) Appl. No.: 13/951,418

(22) Filed: Jul. 25, 2013

(65) Prior Publication Data

US 2014/0014672 A1  Jan. 16, 2014

Related U.S. Application Data

(63) Continuation-in-part of application No. PCT/US2013/022819, filed on Jan. 23, 2013.

(60) Provisional application No. 61/589,437, filed on Jan. 23, 2012.

(51) Int. Cl.
| | |
|---|---|
| *B65D 25/20* | (2006.01) |
| *G06Q 90/00* | (2006.01) |
| *G09F 23/06* | (2006.01) |
| *B62B 3/14* | (2006.01) |

(52) U.S. Cl.
CPC ......... *B65D 25/205* (2013.01); *Y10T 29/49826* (2015.01); *B65D 25/20* (2013.01); *G06Q 90/00* (2013.01); *G09F 23/06* (2013.01); *B62B 3/1484* (2013.01); *B62B 3/142* (2013.01); *B62B 3/1428* (2013.01); *B62B 2501/065* (2013.01)

(58) Field of Classification Search
CPC ....... B65D 25/205; B65D 25/20; G09F 23/06
USPC ..................................... 220/662, 694; 40/308
See application file for complete search history.

(56) References Cited

U.S. PATENT DOCUMENTS

| | | | | |
|---|---|---|---|---|
| 4,616,839 A | * | 10/1986 | Trubiano | 280/33.991 |
| 4,669,209 A | * | 6/1987 | Pollack | 40/793 |
| 5,018,291 A | * | 5/1991 | Pasquale et al. | 40/584 |
| 5,901,482 A | * | 5/1999 | Sawyer et al. | 40/308 |
| 7,472,909 B1 | * | 1/2009 | Gordon | 273/309 |

FOREIGN PATENT DOCUMENTS

JP   200830793 A  *  2/2008

OTHER PUBLICATIONS

English language abstract for JP-200830793-A Date: Feb. 14, 2008.*

* cited by examiner

*Primary Examiner* — Stephen Castellano
(74) *Attorney, Agent, or Firm* — Law offices of Mark A. Hamill, P.C.

(57) ABSTRACT

The present invention is directed to an improved advertising system for use in a wheeled shopping cart having a basket or in a hand carried shopping basket, which includes: a panel receiving aperture formed into at least one of the sidewalls, back wall, front wall, bottom wall or divider wall of the basket of the cart or carried basket; one or more substantially transparent detachable advertising panels with advertising material integrally molded into the panels, the panels being dimensioned to substantially fill the aperture to create the appearance of a permanent wall structure which includes an integrally molded advertising message; at least one panel mounting member for detachably mounting the substantially transparent detachable advertising panels in the panel receiving aperture, and a handle operably connected to the basket. The invention further includes methods of using the system to serially advertise on the shopping baskets of the invention as well as novel substantially transparent detachable advertising panels.

8 Claims, 6 Drawing Sheets

TRANSPARENT SHOPPING CART AND SHOPPING BASKET ADVERTISING PANELS, SYSTEM AND METHODS OF MANUFACTURE AND USE OF SAME

This patent application is a continuation-in-part of PCT Patent Application No. US2013/022819 filed Jan. 23, 2013, which is a continuation-in-part of U.S. Patent Application Ser. No. 61/589,437 filed on Jan. 23, 2012.

BACKGROUND OF THE INVENTION

1. Field of the Invention

The present application is directed to an improved advertising system for use in shopping carts and shopping baskets used by consumers to carry merchandise within a store and to their vehicle in a parking lot.

2. Description of the Prior Art

Prior to the filing of the applicant's '819 and '437 applications, there were a wide variety of different shopping carts available in the commercial marketplace. U.S. Pat. No. 5,613,696 and U.S. Pat. No. 5,794,953 (discussed in detail in the '819 application), illustrate typical prior art approaches to providing an advertising message in a shopping cart. The applicant's general conclusion about the prior art systems was that they utilized impermanent, flimsy advertising materials which detracted from a positive branded image and therefore many image conscious companies have avoided use of shopping cart advertising.

Furthermore, shopping carts are frequently taken out of doors by customers to load purchased products into their cars so that the carts are frequently exposed to rain, snow, and freeze/thaw temperature cycles. For this reason, even if an advertising display material were aesthetically acceptable when first installed onto a cart, the prior art materials could quickly deteriorate into an aesthetically unacceptable appearance. Moreover, shopping carts are frequently nested together in a stacked arrangement by store personnel for transportation and storage in the store parking lot or within the store itself. This means that the advertising materials can often be exposed to forceful mechanical contact with other carts or with the shopping cart corral structures found in many parking lots. For these reasons shopping cart advertising display materials should have a very high degree of aesthetic appeal, yet be durable enough to maintain that appeal when exposed to the challenges of the retail environmental and to harsh outdoor weather conditions. The prior art systems did not fully meet these objectives.

Another problem with prior art shopping cart advertising display systems is that the installation and maintenance of the advertising signs is more cumbersome and involves more expense than the present applicant believes to be desirable. This is because the companies that sell advertising space on such carts have attempted to prevent retail customers from removing their advertising signs by making removal from the cart relatively difficult for children or others without immediate access to the required hand tools. For example, U.S. Pat. No. 3,677,570 discloses that it may include a plastic shell portion that is designed to protect the advertising sign displayed therein from the attentions of children or adolescents.

Applicant's prior '819 and '437 patent applications were directed, in part, to solving such problems by providing a high quality look and feel advertising system for use in wheeled shopping carts. The high quality shopping carts of the '819 and '437 applications include advertising material integrally molded into the transparent structural components (sidewalls, front wall, front gate, back wall, a bottom wall, and/or section dividers) of the basket portion of a wheeled cart. While the applicant's '819 and '437 patent applications provide high quality advertising messages to consumers in wheeled shopping carts, applicant believes that it would be advantageous to have a high quality advertising system which allowed for even more efficient, low cost advertising message substitution in wheeled shopping carts or in hand carried shopping baskets.

OBJECTS OF THE INVENTION

It is one object of the invention to provide an improved high quality shopping basket advertising system having improved message substitution efficiency.

Is another object of the invention to reduce the cost of manufacturing replaceable high quality advertising messages for a shopping basket.

It is a further object of the invention to provide a hand carried shopping basket that includes a high quality advertising message molded into a transparent portion of the basket.

SUMMARY OF THE INVENTION

The present invention is directed to an improved advertising system for use in a wheeled shopping cart having a basket or in a hand carried shopping basket, which includes: a panel receiving aperture formed into at least one of the sidewalls, back wall, front wall, bottom wall or divider wall of the basket of the cart or carried basket; one or more substantially transparent detachable advertising panels with advertising material integrally molded into the panels, the panels being dimensioned to substantially fill the aperture to create the appearance of a permanent wall structure which includes an integrally molded advertising material bearing an advertising message; at least one panel mounting member for detachably mounting the substantially transparent detachable advertising panels in the panel receiving aperture, and a handle operably connected to the basket. For purposes of describing and claiming the invention(s) of this application, the term "advertising message" means any advertising or promotional information and advertising or promotional message, including any image, graphic design, trademark, slogan, or trade name of any product manufacturer, distributor, wholesaler, retailer or service provider.

In one preferred embodiment of the invention, the at least one panel mounting member includes a pair of spaced apart slots defined by a pair of ledges formed along the along two opposite peripheral edges of the aperture for retaining two opposite edges of the panel. The two slots are dimensioned to receive at least two opposite peripheral edges of the panel. In the first embodiment of the invention, additional mounting member may also be included in the basket design, such as, a plurality of mounting opening or slits formed in the basket which are dimensioned to receive a plurality of snap-fit prongs. The mounting slits and snap fit prongs assist in retaining the substantially transparent detachable advertising panel in the slots and further assists in ensuring the advertising panel does not shake or rattle within the slots when the basket is rolled or carried. This arrangement contributes to the impression that the advertising message is a permanent, integral part of the basket wall and contributes to the high quality aesthetic appeal of the cart or basket. Preferably, the snap-fit prongs include a pair of inclined surfaces molded into the inner surface of the panel, and a stop surface located adjacent to the incline surface for preventing removal of the advertising panel during use by store customers. The pair of inclined surfaces are spaced apart a predetermined distance which corresponds to the opening in one of the mounting slits so that the opposing edges of the mounting slit force the inclined surfaces inwardly during insert of the panel and allow the surfaces to snap back once the panel is fully inserted and the stop surfaces engaged in the opposing inner edges of the mounting slit. The prong stop surface includes an overhanging portion that extends inwardly from the inner surface of the panel and is dimensioned to prevent the edges of the panel from being slid out of the pair of slots by customers or children. Preferably, at least one framing ledge surrounds at least one portion of the panel receiving aperture to strengthen the area of the basket where the substantial transparent detachable advertising panel is joined to the basket. Preferably, after suitable instruction, the panel substitution process can be completed without the use of hand tools. Changing of the advertising message can be accomplished by store personnel, in most cases without the use of tools, by simply removing a first advertising panel from the slots and inserting a new advertising panel having a different advertising message into the slots. In stores or for retailers that value increased panel security, the basket can be provided with a set screw which may be inserted into an aperture formed near the bottom edge of the panel and passes into a threaded receiver mounted in a bore formed in the ledge defining the slot(s).

In another preferred embodiment of the invention, a substantially transparent hand basket is provided having a substantially transparent detachable advertising panel which is detachably mounted in an advertising panel aperture formed in one of the sidewalls, back wall, front wall, bottom wall or divider wall of the hand basket. The basket having at least one mounting member for assisting in the detachable mounting of the substantially transparent detachable advertising panel in the advertising panel aperture and having a handle extending from the top portion of the hand basket for carrying the basket during a shopping trip. The shopping hand basket is smaller than the basket for the carts of the invention as it is dimensioned for hand carrying. The at least one panel mounting member includes a lip formed around at least a portion of the periphery of the panel receiving aperture in the inner surface of the basket wall with the lip being dimensioned to receive at least a portion of the inner surface of the substantially transparent detachable advertising panel immediately adjacent to the outer peripheral edges of the substantially transparent detachable advertising panel. Additional mounting members may be provided to the baskets of the invention such as selectively locking connector receipt apertures which are dimensioned to receive selectively locking connectors to detachably connect the substantially transparent detachable advertising panel to the basket. Preferably, the selectively locking connector is a quarter turn lock mounted in the lip portion of the basket adjacent to the periphery of the panel receiving aperture.

In still another aspect of the invention, a substantially transparent detachable advertising panel for use in a shopping basket having a panel receiving aperture is provided. The substantially transparent detachable advertising panel including a substantially planar panel body molded from a substantially transparent thermoplastic resin, the substantially planar panel body being dimensioned to substantially fill the panel receiving aperture so that the panel body appears to constitute a permanent portion of one of at least one of the walls of the basket. The panel body includes a substantially planar advertising material insert molded into a portion of the substantially planar panel body. The substantially planar advertising material insert includes one or more advertising message. The panel body further includes at least one mounting member for detachably securing the substantially planar panel body to the shopping cart. In one embodiment of the invention, the at least one mounting member is at least one selectively locking connector receipt aperture which is dimensioned to receive a selectively locking connector to detachably connect the substantially transparent detachable advertising panel to the basket. In another embodiment of the invention, the at least one mounting member includes at least one resilient snap fit connector molded into a surface of the panel body.

In a still further aspect of the invention, a method for providing serial, high quality advertising material for simultaneous display to a store customer using a shopping basket and to other store patrons is provided. The method including the steps of providing a shopping basket having a first substantially transparent detachable advertising panel mounted to, and appearing to constitute, a permanent portion of one of the structural walls defining the basket. The substantially transparent detachable advertising panel further has an integrally molded advertising material located within the interior space of the substantially transparent detachable advertising panel. The first integrally molded advertising material is simultaneously displayed during a shopping trip to both the customer using the basket and other store patrons. Thereafter, the first substantially transparent detachable advertising panel is removed from the wall of the basket. Then, a second substantially transparent detachable advertising panel is provided having a second integrally molded advertising material located within the interior space of the second substantially transparent detachable advertising panel. The second substantially transparent detachable advertising panel is mounted into the same portion of one of the basket structural wall formerly occupied by the first substantially transparent detachable advertising panel. Then, the second integrally molded advertising material is simultaneously displayed during a shopping trip to both the customer using the basket and other store patrons.

DETAILED DESCRIPTION OF THE DRAWINGS

FIGS. 1-6 illustrate a first embodiment of the invention in which a shopping cart 20 is formed of a number of structural components including, a substantially transparent basket 22, the basket having an substantially transparent detachable advertising panel 120 that is detachably mounted in advertising panel aperture 130, a frame 40 attached to and supporting the basket 22, a front gate 50 at the front end of the basket 22, a rear handle 60 on the back end of the basket 22, a pair of front caster assemblies 70a and 70b attached to the frame 40, a pair of fixed back wheels 80a and 80b attached to the frame 40, and a bottom tray 90 attached to the frame 40. The shopping cart 20 is similar in many respects to the basket described in applicant's co-pending PCT Patent Application No. US2013/022819 filed Jan. 23, 2013 (the "'819 PCT application"), the description of the cart and basket found in paragraph 42 through 62 as well as FIGS. 1-11 of the '819 application showing the cart and basket are incorporated herein by reference. The differences between the two baskets and two carts of each of the two applications will be spelled out in detail below. The primary difference between the basket shown in the '819 PCT application and the basket 20 of the embodiment of the invention shown in FIGS. 1-6 is the addition of a substantially transparent detachable advertising panel 120 that is detachably mounted in advertising aperture 130. The provision of the substantially transparent detachable advertising panel 120 is intended to provide a more efficient means of substituting or replacing an advertising message on the basket while still providing a high quality, permanent look to the structure displaying that message on the basket.

The substantially transparent detachable advertising panel 120 is preferably made by injection molding with a substantially transparent thermoplastic resin. The preferred thermoplastic resins for formation of both the shopping cart basket 22 and the substantially transparent detachable advertising panel 120 are Tritan® or Tenite®, which are products of Eastman Chemical Company of Kingsport, Tenn. As the substantially transparent detachable advertising panel 120 will be designed to appear to be a permanent part of the basket structure, tinting material can be used to match the color of the basket upon which the substantially transparent detachable advertising panel will be mounted. However, for aesthetic reasons, a basket may be designed with one or more contrasting tinted portions in which case the substantially transparent detachable advertising panel may be tinted a color that accentuates such a contrasting color design. Moreover, other transparent or translucent thermoplastic resins such as polycarbonate (PC) resin or Styrene acrylonitrile (SAN) resin SAN may also be used to form the substantially transparent detachable advertising panel 120, but it is preferred that the same materials with the same tint are selected for both the basket 22 and substantially transparent detachable advertising panel 120 to enhance the visual perception that the panel is a permanent part of the structure. Alternately, multiple tinting materials may be added to the thermoplastic resin to form a multi-color substantially transparent detachable advertising panel.

In the embodiment of FIGS. 1-6, the panel advertising material 30a is shown having been mounted via the substantially transparent detachable advertising panel 120 into the side wall 24(b) of the shopping cart basket 20. The substantially transparent detachable advertising panel 120 is preferably relatively thin and substantially planar so that it appears to be a permanent, integral portion of one of the large surface area structural portion (sidewall 24a-b, floor 21, back wall 39, divider panel, and/or front gate 50) of the basket 22 in which it is mounted. However, where the large surface area structural portion includes a significant amount of curvature, the substantially transparent advertising panel 120 may be curved to match the curvature of the larger surface area structure surrounding advertising panel aperture 130. The preferred thickness dimensions of the substantially planner advertising panel 120 are between about ⅟₃₂ and ¾ inches thick, which should match the thickness of the corresponding structural portion of the basket 22. The preferred curvature of the substantially transparent detachable advertising panel 120 is between about a curvature of zero (flat) in both the vertical and horizontal direction and a curvature of about 0.04 inch$^{-1}$ in the vertical direction and about 0.04 inch$^{-1}$ in the horizontal direction. For ease of illustration, the embodiment of FIGS. 1-6 show a single cart advertising material 30 molded into the front gate 50 and a single panel advertising material 30a mounted via the substantially transparent detachable advertising panel 120 into the side wall 24(b) of the shopping cart basket 22. Alternately, the panel advertising material 30a may be mounted via the substantially transparent detachable advertising panel 120 into an advertising aperture formed in one or more of the other large surface area structural portions of the shopping cart basket 22, such as, the shopping cart basket floor 21, shopping cart sidewall 24a, shopping cart back wall 39, divider panel, and/or front gate 50. Moreover optionally, the front gate 50 may be replaced by a solid front wall structure (not shown) with an advertising aperture formed therein for the mounting of a substantially transparent detachable advertising panel 120. Further, the shopping cart basket 22 may be provided with multiple molded in cart advertising materials 30 molded into the interior of more than one of the large surface area structural portions of the basket as well as multiple panel advertising materials 30a mounted in multiple advertising apertures formed in more than one of the large surface area structural portions of a single basket. Still further, the basket 22 may include only a single panel advertising materials 30a and lack any permanent cart advertising material. Optionally, the crush zone protector divider panel may be omitted from the cart.

The panel advertising material 30a is preferably a multiple color, three-dimensional graphic mold insert bearing an advertising message. In the embodiment of FIGS. 1-6, the advertising material 30a is shown as a simple, black and white schematic advertising applique bearing the schematic "AD" advertising message for ease of illustration. The use of the three-dimensional advertising material embedded in the substantially transparent interior space of substantially transparent detachable advertising panel 120 mounted on the basket 22 provides for an eye-catching, permanent, high quality presentation of the chosen advertising message. The panel advertising material 30a is preferably made of a heat resistant material such as polycarbonate, PET, acrylic, ABS, PVC and PS to withstand the hot, chemically volatile conditions found in the mold cavity during the injection molding process. The advertising may be a relatively rigid applique sheet that stands readily in the mold cavity prior to injection, but may include cut outs and voids to be filled by resin as long as those features do not detract from the overall rigidity of the sheet. Alternately, the panel advertising material 30a may constitute a printed advertising message on a carrier film that enters the mold cavity via an automated reel to reel feed mechanism. The preferred films for printing advertising material are heat resistant polyester carrier films, such as, Avoloy™ or Softouch™. If the advertising material 30 and/or panel advertising material 30a are rigid appliques, it is preferable to prepositioned such appliqués in the mold cavity by an automated robotic arm prior to injection molding of the large surface area structural portion of the cart containing the advertising material 30 and the substantially transparent detachable advertising panel 120. However, for large volume runs of large surface area structural portion of the cart containing the advertising material 30 or substantially transparent detachable advertising panels 120 having the same panel advertising material 30a, reel-to-reel in mold decorating processes are preferred due to the lower cost per mass printed graphic image on the film relative to manufacturing large volumes of separate rigid appliques.

When combined with the aesthetically appealing features of the substantially transparent shopping basket, applicant believes the quality of aesthetic appeal of such advertising will be far more appealing to consumer packaged goods companies as a platform for shopper marketing messages. Furthermore, as the panel advertising material 30a is mounted in a substantially transparent portion of the shopping cart basket 22, it is simultaneously visible from both the exterior of the cart to other shoppers in a store as well as from the viewing angle of the shopper pushing the cart. For this reason, it is preferred that shopping cart basket 22 is substantially transparent throughout substantially all of its large surface area structural portions, such as the shopping cart basket floor 21, shopping cart sidewalls 24a-b, shopping cart back wall 39, divider panel, and/or front gate 50, except in the portion(s) of those areas in which advertising material(s) 30 and/or panel advertising material(s) 30a are mounted. The dimensions of the advertising materials 30 and 30a are preferably selected to be large enough to stand out against the substantially transparent cart basket 22 and to provide aesthetic appeal to the cart 20, but not so large as to obstruct cashier's view of the basket interior during customer check out. Accordingly, typical advertising material dimensions will vary between about 3 inches and about 24 inches in height, about 3 inches and about 30 inches in length, and about 1/16 inch and about 3/16 inch in width. Alternately, some portions of the shopping cart basket 22 and the substantially transparent detachable advertising panel 120 may be molded from a translucent or opaque resin as long as such opaque portions do not significantly obstruct shopper's view of the advertising message on advertising material 30 or panel advertising material 30a from either the interior or exterior of the basket or the cashier's view of the interior of the basket during check out. If the advertising materials 30 or 30a include numbers, letters or other symbols that would look odd or different when viewed from the inside versus the outside of the cart, it is preferred that an opaque backing layer is first applied to applique sheet or the carrier film prior to the printing on the advertising materials 30, 30a. The use of an opaque backing layer on the advertising materials 30 or 30a allows the advertising message to be printed on both the front facing and rear facing sides of the applique (or carrier film) with the numbers, letters or other symbols appropriately oriented prior to insertion of the advertising materials 30 or 30a into the mold cavity.

Where a solid substantially transparent detachable advertising panel is to be used in a particular cart design, the panel receiving aperture 130 is sized so that it covers a significant portion of one of the large surface area portion(s) of the basket, but still leaves enough room for a inclusion of a sufficient number of voids areas 25 in the remainder of the large surface area portions of the cart 20 to avoid a potentially dangerous "cart sail" effect wherein strong winds might cause the cart to be pushed along in the parking lot when empty and unattended. Furthermore, where shopping cart design calls for a relatively large substantially transparent detachable advertising panel 120 and the remainder of the cart might have less than the optimal number of void areas, the large substantially transparent detachable advertising panel may be designed to include a number of void areas 25a in order to avoid both a "cart sail" effect and excessive material cost for the manufacturing of such a large advertising panel. As shown in FIGS. 1-6, the void areas 25a can be arranged adjacent to shopping bag hook projection portions 121a-d to provide a structure for hanging shopping bags having strap portions. The hook projections 121a-d may optionally be omitted from the substantially transparent detachable advertising panel 120 particularly if a bag hanging from hook projections 121a-d might detract from the visibility or the aesthetic appeal of the advertising message on the advertising material 30a However, the void areas in the substantially transparent detachable advertising panel 120 may also be circular voids similar to the voids 25 and 91 shown in the cart basket 22 so long as the circular voids do not detract from the appearance of the panel advertising material 30a. Optionally, the basket 22 may have one or more portions in which the void areas 25 and alternating solid areas of the large surface area structural portions (e.g., sidewalls 24a,b, basket floor 21, back wall 39, and/or front gate 50) of the cart 20 include a grid pattern rather than flat portions alternating with circular voids shown in the embodiment of FIGS. 1-6. In such an optional cart basket design, portions of the substantially transparent advertising panel may also include a matching grid pattern so long as the grid enhances the cohesive design of the basket and does not significantly obscure the view of the advertising material 30 or advertising panel material 30a.

Figure 1:
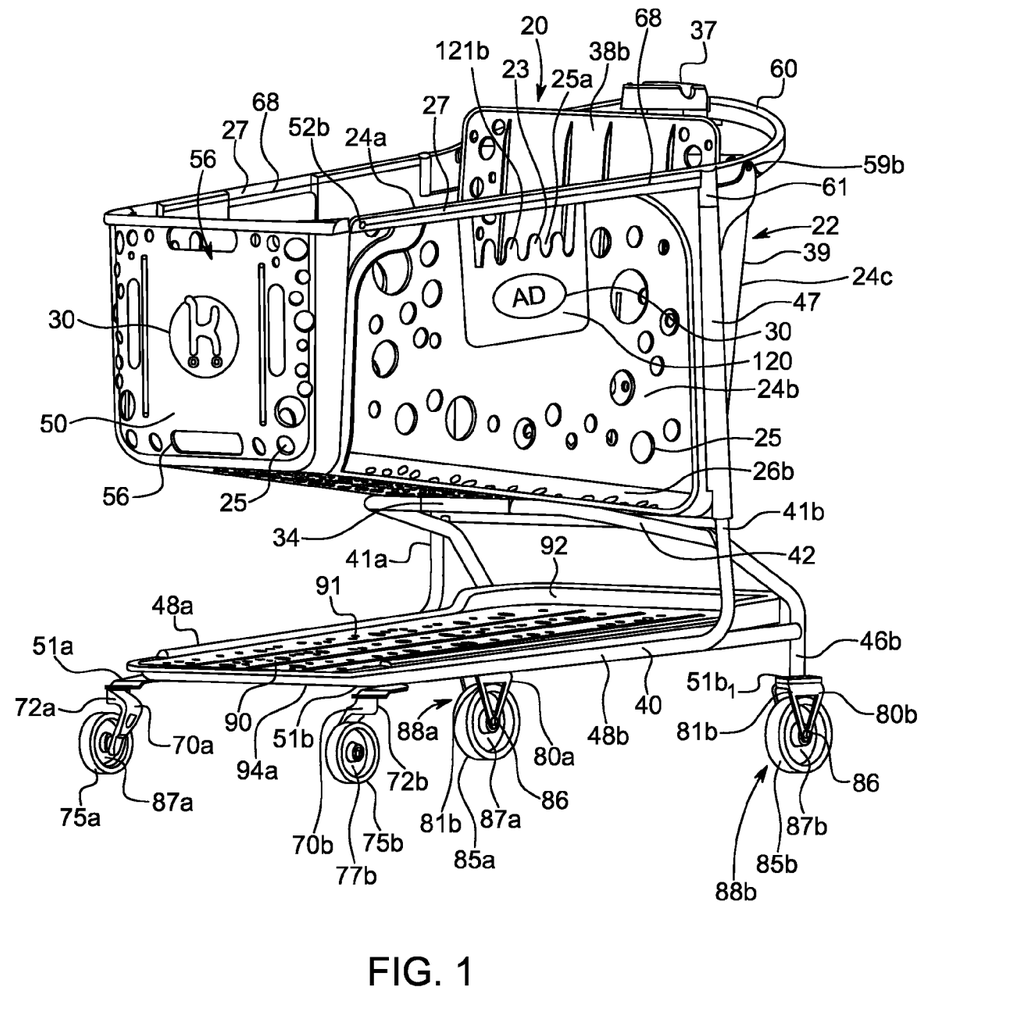
FIG. 1 is a front side perspective view of a shopping cart basket with an advertising panel in accordance with one embodiment of the invention.
Figure 2:
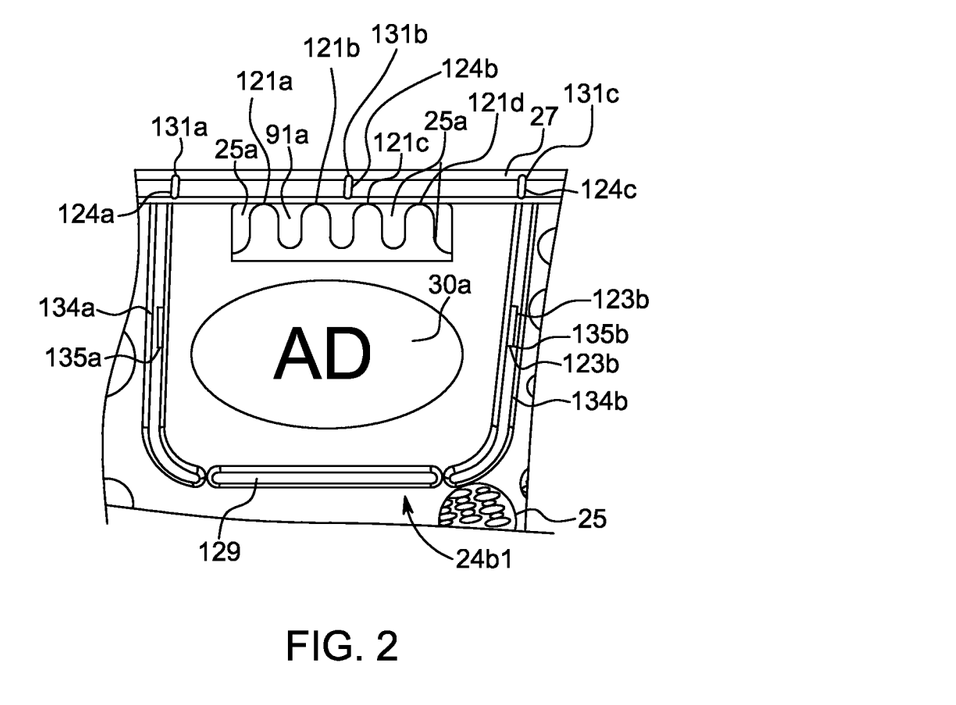
FIG. 2 is a fragmentary enlarged exterior plan view of the advertising panel mounted in the basket of FIG. 8.
Figure 3:
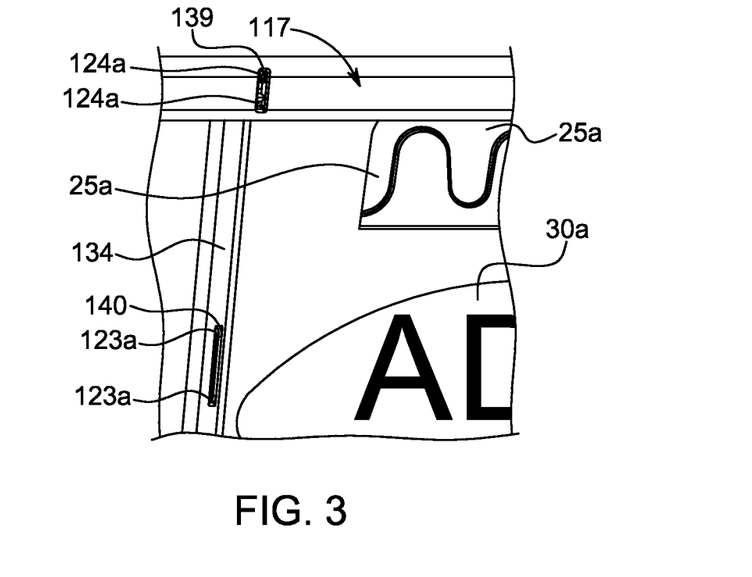
FIG. 3 is a fragmentary enlarged exterior plan view of the upper left corner of the advertising panel mounted in the basket of FIG. 1.
Figure 4:
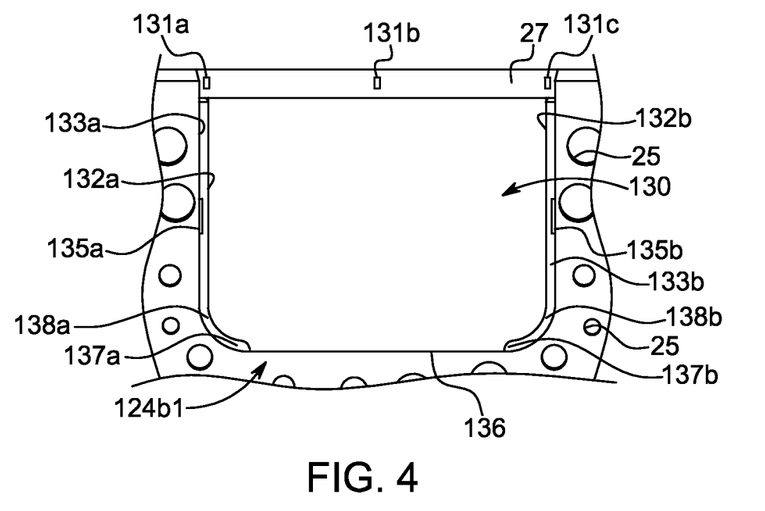
FIG. 4 is a fragmentary enlarged perspective interior view of the advertising panel aperture with the advertising panel of the shopping cart basket of FIG. 8.
Figure 5:
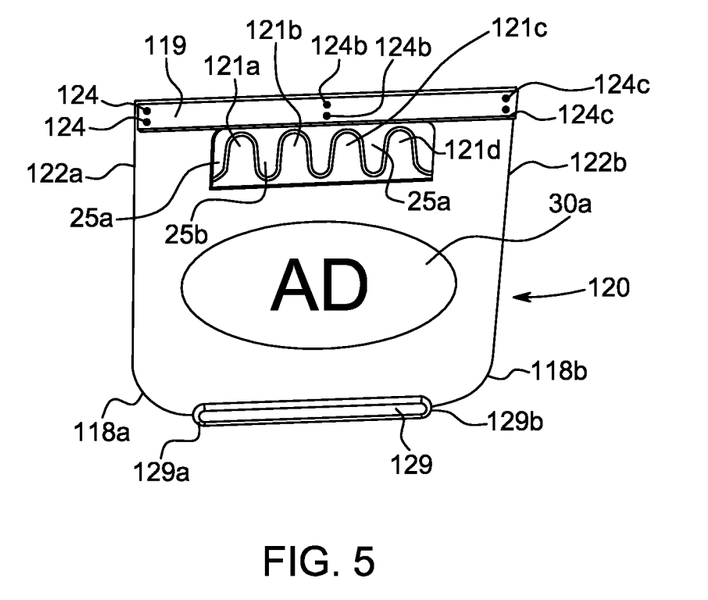
FIG. 5 is an enlarged interior surface plan view of the advertising panel of the shopping cart basket of FIG. 1.

In order to enhance the high quality, aesthetic appeal of the cart 20, the panel receiving aperture 130 is dimensioned within the basket 22 to create the appearance of a permanent, integral structural portion of the substantially transparent cart basket 22. Applicant has found that panel receiving apertures 130 located in the upper half of portion of the basket sidewall(s) and having a height of between about 8 and about 11 inches, and a length of about 12 and about 16 inches are preferred for most cart designs. These dimensions and substantially transparent detachable advertising panel placement provide for good aesthetic appeal and sufficient basket strength to provide for an aesthetically pleasing, economical, long lasting cart basket. As best seen in FIG. 2-4, the uppermost portion of the panel receiving aperture 130 is bounded by outwardly extending rim 27. Three panel mounting opening or mounting slits 131a-c are formed in the outwardly extending rim 27 and are spaced apart along the portion of the outwardly extending rim 27 adjacent to the panel receiving aperture 130. Each of the three panel mounting slits 131a-c have a pair of edges that are dimensioned for receipt of a snap-fit panel mounting prong 124a-c (See FIGS. 3, 5 and 6) formed in the outer surface of the substantially transparent detachable advertising panel 120. On the interior surface of the basket, a pair of ledges 133 extend inwardly from inner side wall of the basket and downward from the uppermost portion of the aperture 130 just below the rim 27. The pair of ledges 133 define a pair of slots 132 which run along the opposing sides of the panel receiving aperture 130. The pair of ledges 133 and the pair of slots 132 formed thereby extend around the pair of lower corners 138 of the panel receiving aperture 130, and terminate adjacent to the pair of corners 138 along the outer periphery of bottom edge 136 of the panel receiving aperture 130. The pair of slots 132 are open on their upper ends adjacent to the rim 27 and on their lower ends along the bottom edge 136 of the panel receiving aperture 130. The pair of lower corners 138 are spaced apart a distance that is sufficient to allow insertion of the pair of panel lower corners 118 and to support the lower corners 118 when fully inserted into the slots 132a,b, of the substantially transparent detachable advertising panel 120. On the exterior surface of the basket 22, a pair of opposing aperture framing members 134 extend downwardly from rim 27 toward the bottom edge 136 of panel receiving aperture 130. The aperture framing members 134 enhances the rigidity of the cart 22 at the junction between the substantially transparent detachable advertising panel 120 and cart sidewall 24b.

As best seen in FIG. 2-4, the panel receiving aperture 130 and substantially transparent detachable advertising panel 120 include a number of panel mounting members for assisting in detachably securing the substantially transparent detachable advertising panel 120 in the panel receiving aperture 130. In the embodiment of FIGS. 1-6, the panel mounting member includes the pair of ledges 133a,b which define the pair of spaced apart slots 132a,b formed along two opposite peripheral edges of the panel receiving aperture 130 as well as the pair of opposing panel edges 122 which are dimensioned for retention within the pair of slots 132a,b. Further, in the embodiment of FIGS. 1-6, the panel mounting members further include the mounting slits 131a-c formed in the rim 27; a pair of elongated mounting openings or elongated mounting slits 135a-b formed in the pair of framing members 134a,b; prongs 124a-c formed in the outer surface of the substantially transparent detachable advertising panel 120, which prongs 124a-c are dimensioned to snap fit into the mounting slits 131a-c; as well as elongated prongs 123a,b formed on the outer surface of substantially transparent detachable advertising panel 120, each of which is dimensioned to snap fit into one of the elongated mounting slits 135a,b. The panel mounting members further include central retention ridge 129, bottom edge 136 of the panel receiving aperture 130, and lower terminal ends 137a,b of the pair of ledges 133a,b. The central retention ridge 129 extends slightly outwardly from the substantially transparent detachable advertising panel 120 and is dimensioned to abut the outer surface 24b(1) of the cart wall 24b (see FIG. 2) between lower ends 137 of the pair of ledges 133a,b to abut the lower terminal ends 137 of the pair of ledges 133a,b and at its terminal ends 129a,b. The panel mounting members of the embodiment of FIGS. 7-11 of the invention include, lip 336, inner surface of the substantially transparent detachable advertising panel immediately adjacent to the outer peripheral edges, peripheral edges of the substantially transparent detachable advertising panel.

12. The improved shopping basket of claim 11 wherein the at least one panel mounting member includes at least one selectively locking connector formed in a lip portion of the basket located adjacent to the panel receiving aperture, the selectively locking connector aperture being dimensioned to receive a selectively locking connector to detachably connect the substantially transparent detachable advertising panel to the basket.

13. The improved shopping basket of claim 12 wherein the at least one locking connector is a rotatable locking connector which allows removal of the substantially transparent detachable advertising panel when the rotatable locking connector is rotated into a first position relative to the substantially transparent detachable advertising panel and locks the substantially transparent detachable advertising panel to the lip when the rotatable locking connector is rotated into a second position relative to the substantially transparent detachable advertising panel.

14. The improved shopping basket of claim 13 wherein the at least one rotatable locking connector includes a proprietary rotational tool receiving slot which is dimensioned to receive a driving end of non-standard rotational tool to rotate the rotatable panel locking member between a first position relative to the substantially transparent detachable advertising panel for mounting and removal of a substantially transparent detachable advertising panel from the ledge and a second position for locking the substantially transparent detachable advertising panel to the ledge.

15. The improved shopping basket of claim 14 wherein the rotatable locking connector includes a rotatable elongated end portion for selectively contacting the outer surface of the substantially transparent detachable advertising panel, the rotatable elongate end being dimensioned to pass through the locking connection aperture when rotated to a first position relative to the substantially transparent detachable advertising panel and wherein the rotatable locking connector further includes a post connected to the elongated end portion for causing rotation of the elongate end portion into a first pass through position to allow the rotatable elongated end portion to be inserted through the locking connection aperture and into a second retention position for detachably mounting the substantially transparent detachable advertising panel by causing the elongated end member to contact the outer surface of the substantially transparent detachable advertising panel. Further including the pair of ledge lower corners 136a,b dimensioned to be supported by the pair of panel lower corners 118a,b upon full insertion of the panel 120. The use of multiple mounting structures helps to ensure that the substantially transparent detachable advertising panel 120 is securely mounted to the basket 22 and helps in prevent rattling when the art is rolled on uneven surfaces such as parking lots.

Figure 6:
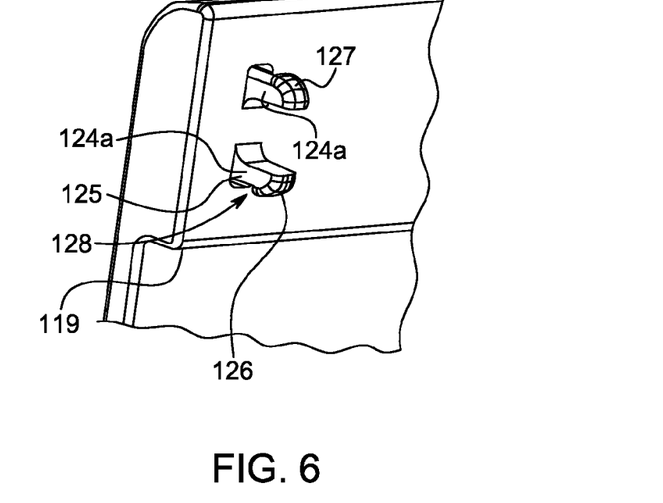
FIG. 6 is an enlarged fragmentary interior perspective view of the upper left corner of the advertising panel of the shopping cart basket of FIG. 1.

Turning now to FIG. 6, the upper portion of the substantially transparent detachable advertising panel 120 includes an outwardly projecting (toward the exterior of the basket 22 when attached) overhanging face portion 119. Each of the pairs of prongs 124a-c extends further outwardly (toward the exterior to the cart) from the overhanging face 119. Each of the pairs of prongs 124a-c include a resilient beam portion 125, end surface 126 formed at the terminus of the beam 125 opposite of the panel 120, deflection surface 127 located on the interior surface of the beam 125 below the end surface 126, and stop surface 128 located on the interior surface of beam 125 below deflection surface 127. When the outer edges of the mounting slit 131a-c engage outwardly angled surfaces of the deflection surfaces 127 during insertion of panel 120 into the advertising receiving aperture 130, the outer edges ride along the outwardly angled deflection surfaces 127 of the pair of prongs 124 thereby biasing the beam portions 125 inwardly until the outer edges of mounting slit 131a-c pass the apex of the angled deflection surface 127 and move along the inwardly angled stop surface 128. This causes previously the inwardly deflected beams 125 to spring outwardly and engage the outer surface 139 of the rim 127 adjacent to the slits 131a-c thereby preventing removal of the substantially transparent detachable advertising panel 120 from the advertising aperture 130 without first inwardly deflecting each of the pairs of prongs 124a-c. The elongated pairs of prongs 123a,b have the same structures (beam, end surface, deflection surface, and stop surface) and interact with elongated mounting slits 135a,b to detachably mount the panel 120 in aperture 130 in the same way as the pairs of prongs 124a-c and mounting slits 131a-c. Accordingly, during insertion the elongated prongs 123 in elongated slits 135a,b, the outer edges 140 of the elongated slits 135a,b ride along the deflection surfaces of the elongated prongs 123 and inwardly bias the beams until the apex of the deflection surfaces is passed and the stop surfaces of the elongated prongs 123 is reached whereby beams spring outwardly and engage the outer surface 140 of the framing member 134 adjacent to the elongated slits 135a,b.

Turning to the embodiment of FIGS. 7-11, those figures illustrate a second embodiment of the invention including a substantially transparent hand basket 222, the basket 222 having a substantially transparent detachable advertising panel 320 that is detachably mounted in an advertising panel aperture 330, and a handle 260 extending from the top portion of the basket 222. The shopping hand basket 222 is similar in some respects to the basket 22 described above in the embodiment of FIGS. 1-6 above. The differences between the two baskets 222 and 22 of each of the two embodiments described herein will be spelled out in detail below. The primary difference between the hand basket 222 and the basket 22 of the embodiment of the invention shown in FIGS. 1-6 is that the basket 222 is smaller and it is dimensioned for hand carrying, as the hand basket 222 also lacks a frame, wheels and front gate. Further, hand basket 222, as can be best seen in FIG. 7, includes a pair of substantially transparent detachable advertising panels 320a,b that are detachably mounted in a pair of advertising panel apertures 330, rather than the single substantially transparent detachable advertising panels 120 shown in the embodiment of FIGS. 1-6. For ease of illustration and explanation, only one of the pair of panels 320b has been show in FIG. 7, but both advertising panel apertures 330 have been shown in that figure.

Both the hand basket 222 and advertising panels 320 are preferably substantially transparent and are injection molded using a substantially transparent thermoplastic resin. The same resins and matching tints (if any are used in a particular basket design) discussed above regarding the embodiments of FIGS. 1-6 may be used for both the hand basket 222 and advertising panels 320. In the hand baskets of the invention, one or more permanent advertising materials 230 may be permanently, integrally molded into one or more of the large surface area structural portions of the basket, such as, the front end portion 250, side walls 224a,b, back wall 239, basket floor 221, or crush zone divider (if one is included in the particular basket design) of the hand basket 222. Moreover, the large surface area structural portions of the hand basket of the invention may have no permanent molded in advertising material, just a single replaceable advertising material, just a single permanent panel molded in advertising material, multiple replaceable panel advertising materials molded into the advertising panel(s), or multiple permanently molded in advertising materials 230 and multiple replaceable panel advertising materials 230 as shown in the embodiment of FIGS. 7-11.

The hand basket 222 has a number of void areas 225 in sidewalls 224a, basket floor 221, front wall 250 and back wall 239 in the embodiment of the invention shown in FIGS. 7-11. However, it is contemplated that additional spaced apart voids in the side walls 224a and 224b may be introduced in order to reduce the overall weight of the basket, particularly if a relatively dense elastomeric resin is selected for the hand basket 222. If a lighter material is selected, the sidewalls 224a and 224b may be molded without void areas. Furthermore, as best seen in FIGS. 7-10, the shopping basket floor 221 preferably include at least some void areas 225 so that the basket 222 does not collect water if the baskets happen to be left outside during a rain event. Basket floor 221 is substantially planar in its central portion and begins to curve upwardly in transition zones 226a and 226b into substantially vertical sidewalls 224a and 224b. The thickness of basket floor 221 and sidewalls 224a and 224b is preferably between about 1/32 inch and about 1/2 inch so that the hand basket 222 has a solid, high quality look and feel due to the increased structural rigidity of the hand basket 222. Likewise, the preferred thickness dimensions of the advertising panel 320 is between about 1/32 and 1/2 inches thick so that it can match the thickness of the corresponding large surface area structural portion of the hand basket 222. Depending upon the particular thermoplastic resin and wall thicknesses selected within the preferred thickness range, it will typically require between about 1/2 pound and about 4 pounds of plastic resin to mold each basket 222. The dimensions of the hand basket 222 can range from a height (excluding the handle) of from between about 6 inches to about 14 inches, a length of between about 12 inches and about 24 inches, and a width of about 10 inches to about 20 inches. The preferred dimensions of the hand basket 222 are a height of about 8 inches, length of about 18 inches, and a width of about 14 inches. Optionally, the hand basket may have one or more portions in which the void areas 225 and alternating solid areas of the large surface area structural portions (front end portion 250, side walls 224a,b, back wall 239, or basket floor 221) of the basket include a grid pattern rather than flat portions alternating with circular voids shown in the embodiment of FIGS. 7-11. In such an optional basket design, portions of the advertising panel may also include a matching grid pattern so long as the grid enhances the cohesive design of the basket and does not significantly obscure the view of the advertising message(s) on the advertising material(s) 230 and/or 230a.

Figure 7:
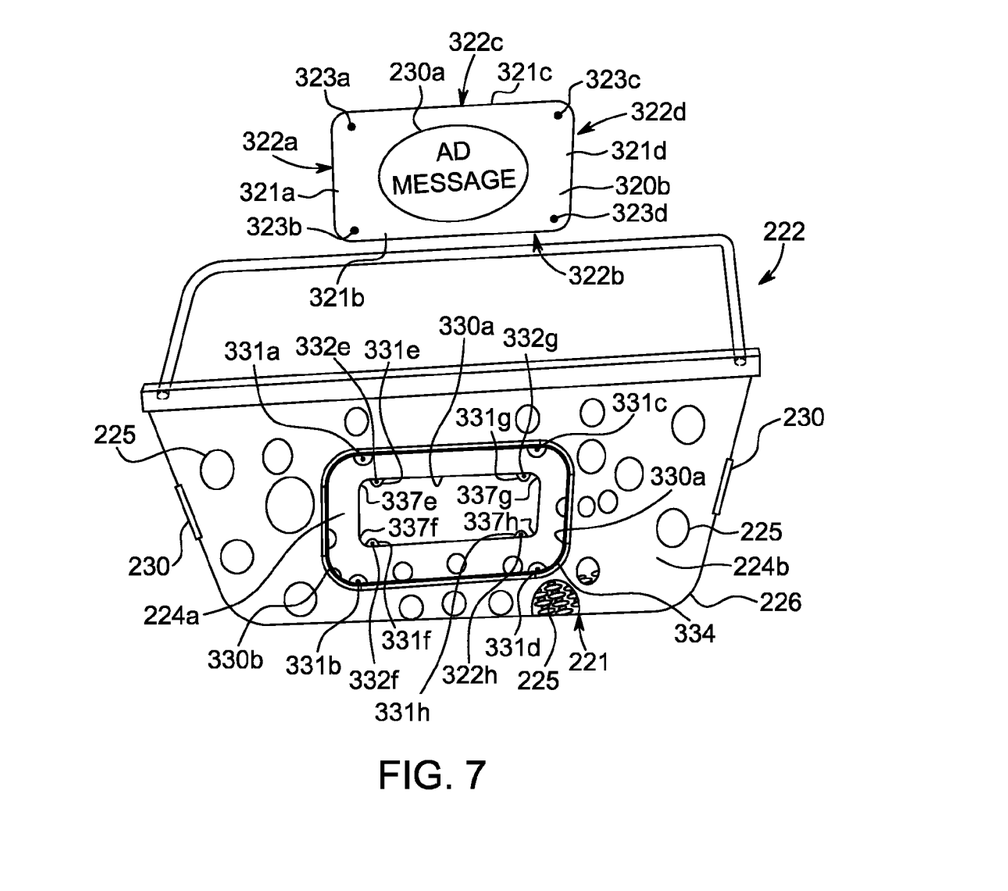
FIG. 7 is a front plan view of a hand carried shopping basket with an advertising panel in accordance with another embodiment of the invention.

Basket 222 further includes a rim 227 along its upper perimeter. As best seen in FIG. 7, the rim 227 includes a pair of hinge mounts 259a,b for the handle 260 on the opposing walls 224a,b of the basket 222. Wherever portions of the hand basket 222 are joined by fasteners or connectors, such as hinges 259a,b, an elastomeric bumper or washer is preferably utilized to cushion the contact between the parts to dampen vibration and any noise created by movement of the basket. In the case of hinges 259a,b, an ethylene propylene diene monomer (EPDM) washer is placed between each of the hinges 259a,b and their respective point of contact with the hand basket 222 or handle 260. While EPDM bumpers and washers are preferred because of their superior elasticity, durability, and UV resistance, washer and bumpers made from other elastomeric material may be utilized in the shopping baskets of the invention. The handle 260 provides the store patron with a place to grasp the basket 222 during shopping trip through the store. The handle may be molded from the same transparent or translucent plastic resin as the basket 222, but preferably includes a contrasting tinting or coloring agent so that it is visually stands out from the basket 222 when it is folded down into the basket adjacent to the rim 227 for stacking purposes. This makes the handle 260 sufficiently visible to ensure that the patron realizes the handle is intended to pivot upwardly from its stacked position to its extended carrying position.

The methods and materials used to manufacture the advertising material 30a and panel advertising material 230a is the same in all respects to advertising material 30a described above in respect to the embodiment of FIGS. 1-6, except as to the smaller dimensions of the advertising material 230 and panel advertising material 230a and the other details explained below. In the embodiment of FIGS. 7-11, the advertising material 230a is shown as a black and white schematic advertising applique bearing a generic "AD MESSAGE" advertising message for ease of illustration. It is preferred that shopping hand basket 222 is substantially transparent throughout substantially all of its large surface area structural portions, such as the shopping hand basket floor 221, sidewalls 224a-b, back wall 239, divider panel (if any), and/or front wall 250, except in the portion(s) of those areas in which an advertising materials 230 and/or panel advertising material 230a have been mounted. The dimensions of the advertising materials 230 and 230a are preferably selected to be large enough to stand out against the substantially transparent hand basket 222 and to provide aesthetic appeal to the basket 222, but not so large as to obstruct cashier's view of the basket interior during customer check out. Accordingly, the dimensions for typical advertising material 230 or 230a range between about 2 inches and about 8 inches in height, about 2 inches and about 12 inches in length, and about 1/32 inch and about 3/16 inch in width. The preferred dimensions for advertising material 230/230a are about 6 inches in height by about 12 inches in length by about 1/16 inch in width. Optionally, portions of the hand basket 222 and the substantially transparent detachable advertising panel 320 may be translucent or opaque as long as they do not significantly obstruct shopper's view of the advertising material 230 or panel advertising material 230a from either the interior or exterior of the basket during a shopping trip.

Figure 8:
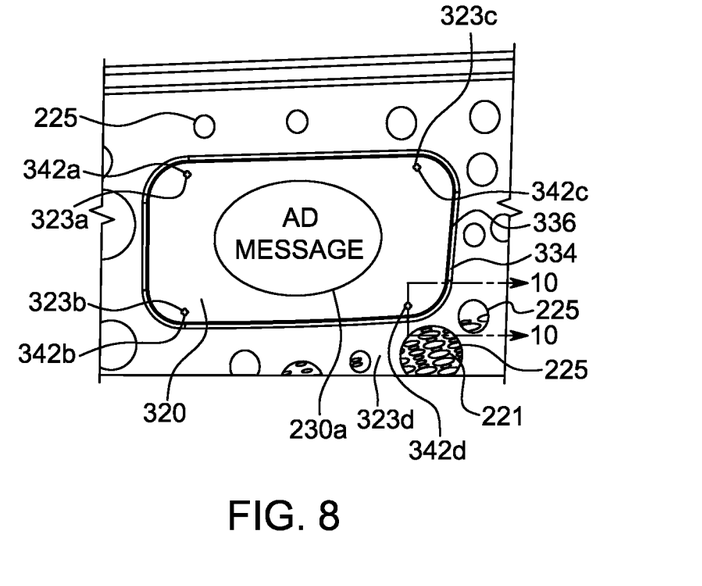
FIG. 8 is a fragmentary enlarged exterior plan view of the advertising panel mounted in the basket of FIG. 7.
Figure 9:
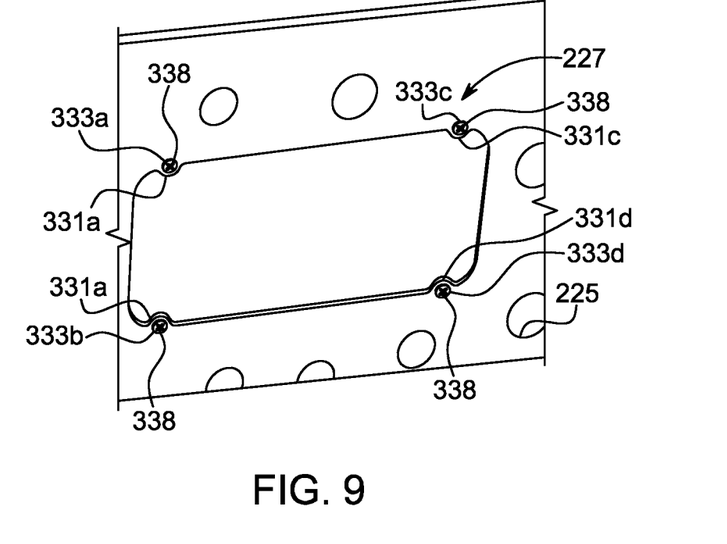
FIG. 9 is a fragmentary enlarged perspective interior view of the advertising panel aperture of the basket of FIG. 8.
Figure 10:
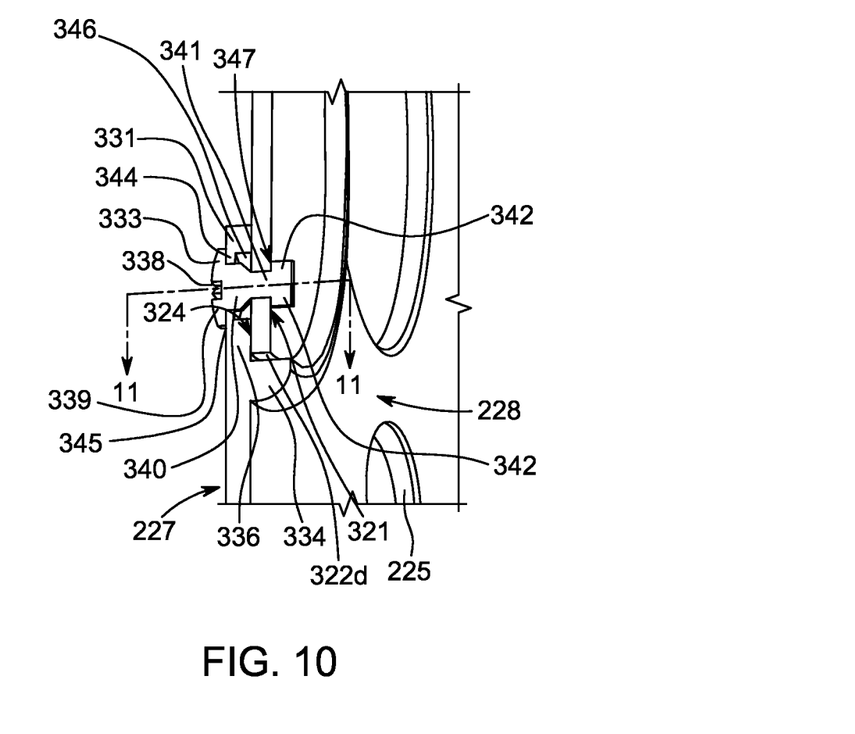
FIG. 10 is an enlarged cross-sectional exterior perspective view taken along lines 10-10 of FIG. 8.
Figure 11:
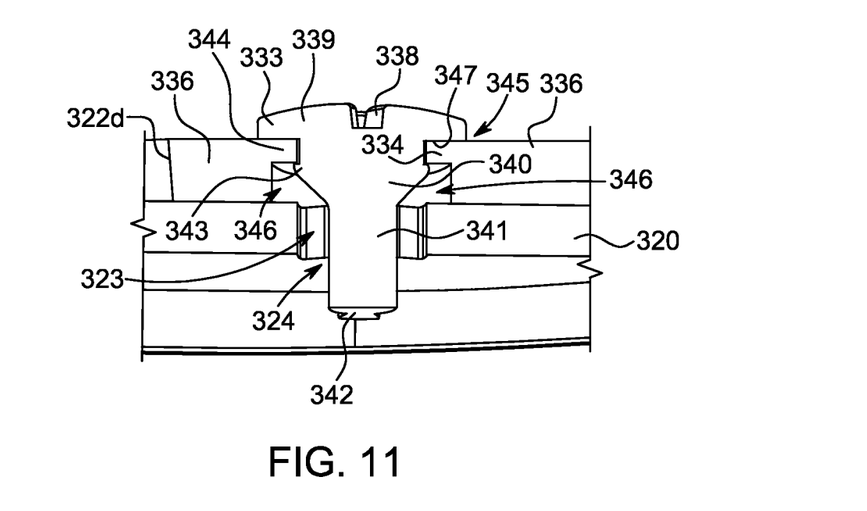
FIG. 11 is a further enlarged cross-sectional view taken along lines 11-11 of FIG. 10.

In order to enhance the high quality, aesthetic appeal of the hand basket 222, the receiving aperture 330 is dimensioned within the basket 222 to create the appearance of being a permanent, integral structure of one of the high surface area structures defining the basket 222. Applicant has found that panel receiving apertures 330 located in the middle portion of the basket sidewall(s) or end walls and having a height of between about 2 inches and about 8 inches and a length of between about 2 inches and about 12 inches. These dimensions and substantially transparent detachable advertising panel placement provide for good aesthetic appeal and sufficient basket strength to provide for an aesthetically pleasing, economical, long lasting hand carried basket 222. As best seen in FIGS. 7-8, and 10, framing ledge 234 is located along each the periphery of each of panel receiving apertures 330a,b and framing ledge 334 extend slightly outwardly from the exterior surface 228 of basket side walls 224a,b. The framing ledge 234 provides a peripheral boundary to the outer edges 322a-d of the substantially transparent advertising panels 320 when mounted to the basket 222 to assist in preventing the panels 320 from moving the rattling or sliding when the basket 222 is in motion. As best seen in FIGS. 10-11, the interior surface 227 of the basket side walls 224a,b includes a narrow peripheral lip 336 located on the periphery of the aperture 330 which, after panel mounting, makes contact with the peripheral front surfaces 321 of the panel 320b adjacent to the peripheral edges 322a-d of the substantially transparent advertising panel 320b. Each of the panel receiving apertures 330a,b includes four projections 331a-h located near corners 337a-h, which extend slightly inwardly from the peripheral lip 336 into the interior of panel receiving apertures 330a,b. Each of the eight total projections 331a-h includes an opening 332a-h, which is dimensioned for receipt of a quarter turn lock member 333a-h. For ease of illustration and understanding, quarter lock members 334e-h have not been shown in FIGS. 7-11.

As can be best seen in FIGS. 8-11, each of the quarter turn lock members 333a-d includes a head portion 339a-d; tool receiving portions 338a-d formed in the surface of the head portions 339a-d; neck portions 340a-d, which extend axially from the head portion 339a-d, and which has annular rib portions 343 extending radially from the neck portions 340a-d; stem portions 341a-d extending axially from the neck portions 340a-d, and an elongated end portions 342a-d extending radially outwardly from stem portions 342a-d. Each of the quarter turn lock members 333a-d is molded from a durable, resilient plastic resin, which is preferably also substantially transparent but may be tinted to make them more visible to ease the process of replacing the advertising panels 320 if desired by the retailer ordering the basket 222. As best seen in FIG. 11, the neck portions 340a-d have a thick cylindrical shape adjacent to the head portions 339a-d and taper radially inwardly forming a frusto-conical shape bottom portion that extend into the narrower cylindrical stem portions 341a-d. After the basket portion 222 is molded, the quarter turn lock members 333a-d are inserted into the opening 332a-d until annular ribs 343a-d pass through annular collars 344a-d and enters notch 346 on the exterior surface of the projections 331a-h. Preferably, the annular ribs 343a-d provide an audible click when fully inserted past the annular collar 344a-d to provide an auditory cue that the panels 320a,b are fully inserted into the opening 332a-h.

As best seen in FIGS. 7-8 and 10-11, each of the four corners 318a-d of the substantially transparent detachable advertising panel 320b includes a horizontally extending rectangular slot 323a-d. Each of the rectangular slots 323a-d is dimensioned to allow the elongated end portion 342a-d of the quarter turn locks 333a-d to pass through the panel 320b so that the inner surface 347 of the elongated end portion 342a-d contacts the exterior surface 321a of the panel 320b. Further, the length of the stem portions 341a-d of each of the quarter turn locks 333a-d and the width of the panel 320b are matched so that the elongated ends 342a-d contact the exterior surface 228 of the panel 320b when the head portions 39a-d are rotated 90 degrees, which in turn, rotates the elongated ends 342a-d into a vertical position from their initial horizontal panel insertion orientation. The pair of substantially transparent detachable advertising panels 320a,b are otherwise substantially planar and can be flat, which allows the panels to be stamp or die cut to size after the advertising material is molded into the main panel body. The substantially transparent advertising panels 320a,b are dimensioned so that their outer edges 322a-d abut the framing ledge 334 when the panels 320a,b are mounted in the panel receiving apertures 330a,b.

For the embodiment of FIGS. 7-11, the mounting members of the basket 222 include: lip 336 formed around at least a portion of the periphery of the panel receiving apertures in the inner surface of the basket wall; inner surfaces 321 of the substantially transparent detachable advertising panels immediately adjacent to the their outer peripheral edges; outer edges 322 of the substantially transparent detachable advertising panel; projections 331 which extend slightly inwardly from the peripheral lip 336 into the interior of panel receiving apertures 330; quarter turn locks 333 mounted in opening 332; openings 332 which are dimensioned for receipt of a quarter turn lock member 333; elongated ends 342 of the quarter turn locks, which are dimensioned to pass through the panel 320 so that the inner surface 347 of the elongated end portion 342 may contact the portion of the exterior surface 228 immediately adjacent 321a to the openings 332 of the panel 320; quarter turn lock stem portion 341 that drives elongated ends 342 to contact the exterior surface 228 of the panel 320 as the head portions 339 are rotated 90 degrees; and the corners 318 of the substantially transparent detachable advertising panels 320 which are dimensioned to snugly fit within the corners 337 of the advertising panel apertures 330. The use of multiple mounting members helps to ensure that the substantially transparent detachable advertising panels 320 are securely mounted to the basket 22 and help to prevent rattling when the basket is carried during a shopping trip.

Both the cart 20 of the invention and the hand basket 22 of the invention have been designed to provide a time and cost efficient method of providing serially replaceable, high quality advertising messages to store patrons and to the customer using the cart or basket at the point of purchase. The methods described below may be used on either the carts or the baskets of the invention. The method for providing serial, high quality advertising material for simultaneous display to a store customer using a shopping basket and to other store patrons include the steps of providing a shopping basket (22, 222)

having a first substantially transparent detachable advertising panel (120, 320) detachably mounted to, and appearing to constitute, a permanent portion of one of the structural walls defining the basket. The substantially transparent detachable advertising panels have a first integrally molded advertising material (30*a*, 230*a,b*) located within the interior space of the substantially transparent detachable advertising panel (120, 320). The first integrally molded advertising material (30*a*, 230*a,b*) is displayed through the substantially transparent portion of the basket during a shopping trip to both the customer using the basket and other store patrons. After a suitable period of time which will typically be determined by either the store owning the cart and/or basket or by the consumer packaged goods company that has licensed the space on the carts and/or baskets of the invention, the first substantially transparent detachable advertising panel (120, 320) is removed from the wall of the basket (22, 222). Thereafter, a second substantially transparent detachable advertising panel (not shown) having a second integrally molded advertising material (not shown) located within the interior space of the second substantially transparent detachable advertising panel is mounted to the same portion of one of the basket structural walls formerly occupied by the first substantially transparent detachable advertising panel. The second integrally molded advertising material is then simultaneously displayed during shopping trips to both the customer using the basket and other store patrons through the substantially transparent portions of the cart and/or basket. The methods of the invention may further include the step of collecting advertising revenue from a first advertiser responsible for authorizing the manufacture and display of the first substantially transparent detachable advertising panel having the first integrally molded advertising material embedded therein and then collecting advertising revenue from a second advertiser responsible for authorizing the manufacture and display of the second substantially transparent detachable advertising panel with the second integrally molded advertising material embedded therein. Because the advertising will have a high quality, substantially permanent appearance, applicant anticipates that consumer packaged goods companies that have formerly been reluctant to use shopping basket advertising will be attracted to and utilize the systems of the invention to conduct high quality, serially different advertising message campaigns on the baskets of the invention.

In the basket of FIGS. 1-6, the substantially transparent detachable advertising panel 120 is removed from the panel receiving aperture 130 by pinching inward on prongs 124*a-c* and elongated prongs 123*a,b* from the exterior of the basket 22. For optimal removal efficiency of transparent detachable advertising panel 120 from cart 20, a custom tool may be provided to the store personnel that has a pair of adjustable pincers spaced apart an appropriate distance to pinch inwardly each of the pairs of prongs 124*a-c* simultaneously, and after a width adjustment, similarly pinch inwardly the pairs of elongated prongs 123*a,b* thereby releasing each of the pairs of prong stops surfaces from the outer surface 117 of the rim 27 and outer surface 138 of the framing member 134, respectively. Then, the substantially transparent detachable advertising panel 120 can be tilted backwardly and slid out from the pair of slots 132*a,b* formed by the ledges 133.

Optimal efficiency for removal of the substantially transparent detachable advertising panels 320 from the hand basket 222 would require no hand tools, but perhaps a coin, letter opener, or pocket knife having a relatively straight edge. In such easy removal iterations of the hand basket 222 of the invention, the tool receiving portion 338 of head 339 of the quarter turn locks 333 have a single broad slot dimensioned for receipt of a wide variety of straight edged objects, such as coins, letter openers, a pocket knife, a slot head screw driver, etc. Unfortunately, in many stores, security of the substantially transparent detachable advertising panels 320 may become an issue in which case it is preferred that a high security version of the quarter turn lock 333 is used which has a non-standard, custom tool receiving portion 338 (star shaped slot, etc.) on head 339. The high security iteration of the basket 222 should prevent all but the most determined advertising panel thieves from removing substantially transparent detachable advertising panels 320 from the hand baskets 222.

What is claimed is:

1. A shopping basket, comprising:
a basket portion having a pair of sidewalls, a front wall, a back wall, and a bottom wall;
a panel receiving aperture formed in at least one of the pair of sidewalls, front wall, back wall, and bottom wall of the basket portion;
a substantially transparent detachable advertising panel with an advertising material integrally molded into the interior space of the substantially transparent detachable advertising panel, the panel being dimensioned to substantially fill the panel receiving aperture to create the appearance of being a permanent wall structure of the basket portion when the substantially transparent detachable advertising panel is mounted in the panel receiving aperture;
at least one panel mounting member for detachably securing the substantially transparent detachable advertising panel in the panel receiving aperture, the at least one panel mounting member including a pair of spaced apart ledges defining a pair of slots formed along two opposite peripheral edges of the panel receiving aperture for retaining two opposing edges of the substantially transparent detachable advertising panel, the pair of ledges defining the pair of spaced apart slots extend inwardly at their respective terminal ends to create a pair of corner support portions on each of the pair of slot for retaining a pair of panel corners adjacent to the two opposing edges of the substantially transparent detachable advertising panel, and a retention ridge extending from the outer surface of the substantially transparent detachable advertising panel and located between the pair of opposing panel corners on the substantially transparent detachable advertising panel, the retention ridge being dimensioned to engage the outer surface of the basket wall upon complete insertion of the substantially transparent detachable advertising panel into the pair of slots; and
a handle portion operably connected to the basket portion.

2. The shopping basket of claim 1 wherein the basket portion further includes a plurality of wheels operably connected to the shopping basket portion so that the improved shopping basket can be wheeled around a store.

3. The shopping basket of claim 1 wherein the handle portion is hinged, and wherein the basket portion is dimensioned for hand carrying by a store customer.

4. The shopping basket of claim 1 wherein the basket portion is molded from a substantially transparent thermoplastic resin so that the advertising material is visible from both the exterior and interior of the basket through at least one of the of sidewalls, front wall, and back wall.

5. A shopping basket, comprising:
a basket portion having a pair of sidewalls, a front wall, a back wall, and a bottom wall;

a panel receiving aperture formed in at least one of the sidewalls, front wall, and back wall and bottom wall of the basket portion;

a substantially transparent detachable advertising panel with an advertising material integrally molded into the interior space of the substantially transparent detachable advertising panel, the panel being dimensioned to substantially fill the panel receiving aperture to create the appearance of being a permanent wall structure of the basket portion when the substantially transparent detachable advertising panel is mounted in the panel receiving aperture;

at least one panel mounting member for detachably securing the substantially transparent detachable advertising panel in the panel receiving aperture, the at least one panel mounting member including a lip formed around at least a portion of the periphery of the panel receiving aperture in the inner surface of the basket wall with the lip being dimensioned to receive at least a portion of the inner surface of the substantially transparent detachable advertising panel immediately adjacent to the outer peripheral edges of the substantially transparent detachable advertising panel, at least one selectively locking connector formed in a lip portion of the basket located adjacent to the panel receiving aperture, the at least one selectively locking connector being rotatable to allow removal of the substantially transparent detachable advertising panel when the selectively locking connector is rotated into a first, unlocked position relative to the substantially transparent detachable advertising panel and to lock the substantially transparent detachable advertising panel to the lip when the rotatable locking connector is rotated into a second, locked position relative to the substantially transparent detachable advertising panel, the selectively locking connector being dimensioned for insertion into a locking connector aperture, the at least one selectively locking connector having a rotational tool receiving cavity which is dimensioned to receive a driving end of a rotational tool to rotate the selectively locking connector between the first, unlocked position and the second, locked position and having a rotatable elongated end portion for selectively contacting the outer surface of the substantially transparent detachable advertising panel, the rotatable elongated end portion being dimensioned to pass through the locking connection aperture when rotated to the first, unlocked position and wherein the rotatable locking connector further includes a post connected to the elongated end portion for causing rotation of the elongated end portion to pass through the locking connection aperture when in the first, unlocked position and to contact the outer surface of the substantially transparent detachable advertising when rotated into the second, locked position; and a handle portion operably connected to the basket portion.

6. The shopping basket of claim 5 wherein the basket portion further includes a plurality of wheels operably connected to the shopping basket portion so that the improved shopping basket can be wheeled around a store.

7. The shopping basket of claim 5 wherein the handle portion is hinged, and wherein the basket portion is dimensioned for hand carrying by a store customer.

8. The shopping basket of claim 5 wherein the basket portion is molded from a substantially transparent thermoplastic resin so that the advertising material is simultaneously visible from both the exterior and interior of the basket through at least one of the sidewalls, front wall, and back wall.

* * * * *